A. SCOTT.
Corn-Harvesters.
No. 141,466. Patented August 5, 1873.
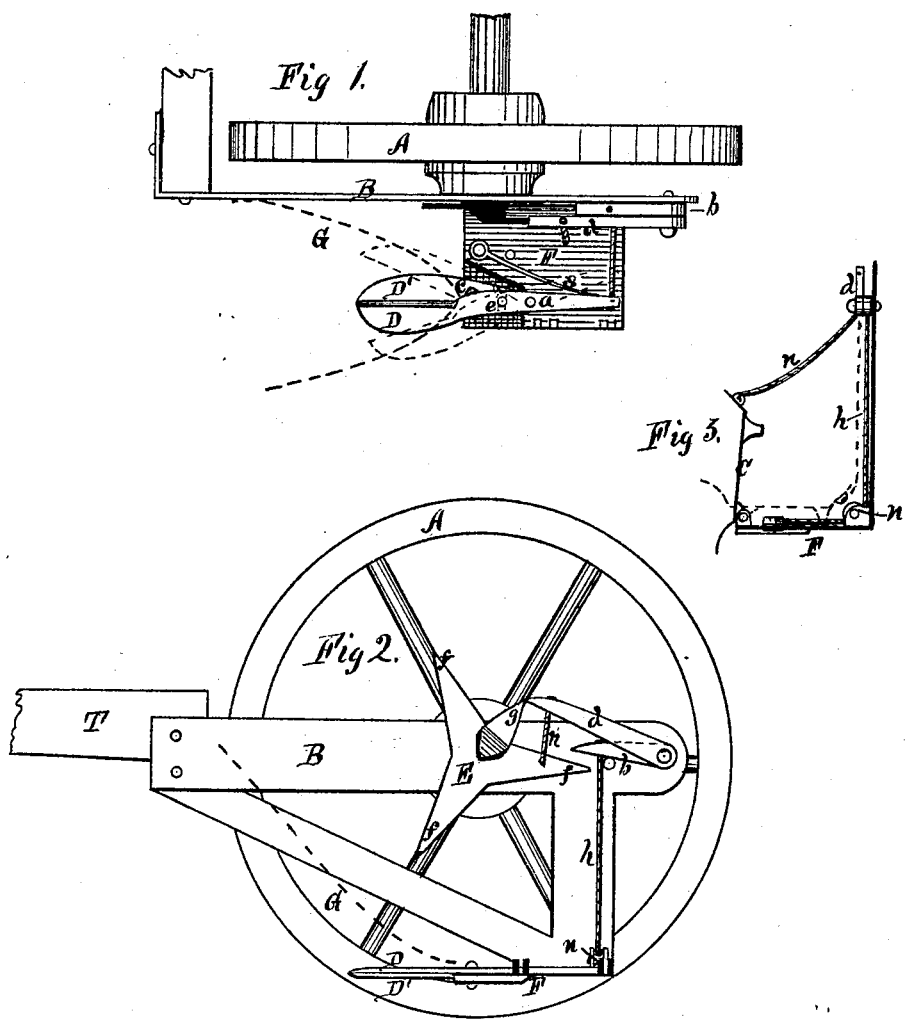

UNITED STATES PATENT OFFICE.

ALEXANDER SCOTT, OF ROCHESTER, NEW YORK.

IMPROVEMENT IN CORN-HARVESTERS.

Specification forming part of Letters Patent No. 141,466, dated August 5, 1873; application filed May 14, 1873.

*To all whom it may concern:*

Be it known that I, ALEXANDER SCOTT, of the city of Rochester, in the county of Monroe and State of New York, have invented certain Improvements in Corn-Harvesters, of which the following is a specification:

This invention consists in a peculiarly-constructed cutter opened gradually by the revolution of the carrier or ground wheels, and closed instantaneously by a spring after receiving the stalks of the hill; and in a dropping device also operated by the carrier-wheels.

Figure 1 is a top or plan view of my invention as applied to one side of the harvester, the dropper being removed. Fig. 2 is a side elevation of the same. Fig. 3 is a rear view of the harvester as attached to the left side of the machine.

A represents one of the ground or carrier wheels; B, the side frame or harvester-hanger; C, one of the tilting gatherers; D and D', the pivoted cutter-blades; E, the star-wheel which actuates the cutters and tilts the gatherers; and T a section of the pole. The cutter-blade D is pivoted to the base F at $a$, and the blade D' at $c$, and they are connected together by a slotted joint at $e$. The base F is recessed or sunken to receive the cutter-blade D', as shown in the drawings. The short pivoted latch $b$ is connected to the end of the shank of the cutter-blade D by means of a cord or chain, $h$, which passes down around the pulley $n$. The latch $d$ is connected by a similar cord or chain to the inner or swinging edge of the tilting gatherer, which is hinged to the outer edge of the base F, as shown more fully in Fig. 3.

A gathering-guard may be attached to the side frame, as indicated by the dotted line G, Figs. 1 and 2, to collect the stalks and force them to enter or be received by the cutter-blades.

Either the ground-wheels or the star-wheels should be ratcheted to the main supporting-shaft, as usual in this class of machines. The star-wheels should be made detachable, so as to be changed for those having a greater or less number of points $f$, according to the distance the hills are planted apart.

Instead of the point $g$ to tilt the gathering-platform a worm-gear that would permit of one and a half or two, or even more, revolutions of the carrier-wheels before it was made to tilt might be used, or any other equivalent device.

The carrier-wheels are so arranged as to bring the cutters on the opposite sides the same distance apart that the rows of grain are planted, and the machine should be started so as to have the cutter-blades fully open at the time they meet the hill. When the star-point $f$ is passing the end of the latch $b$, the spring $s$ forces the blades together, and thereby cuts the stalks, which fall upon the gathering-platform, and when the desired number of hills are cut the point $g$ lifts the long latch $d$, which, through the cord $n$, tilts the platform C and discharges the gavel.

What I claim as my invention is—

1. The receiving-platform C operated by the point $g$, latch $d$, and cord $n$, or its equivalent, in the manner shown and described, for the purposes set forth.

2. The movable cutters D and D', connected as described, and arranged so as to be opened by a cord or its equivalent, and closed by a spring or otherwise instantaneously, for the purposes set forth.

ALEXANDER SCOTT.

Witnesses:
WM. S. LOUGHBOROUGH,
C. R. FERGUSON.